United States Patent [19]

Schlotterbeck et al.

[11] Patent Number: 4,582,274

[45] Date of Patent: Apr. 15, 1986

[54] MOTOR VEHICLE WITH BELT RETRACTOR FOR A SEAT BELT SYSTEM

[75] Inventors: Friedrich-Karl Schlotterbeck; Larry Merryfield, both of Russelsheim, Fed. Rep. of Germany

[73] Assignee: General Motors Corporation, Detroit, Mich.

[21] Appl. No.: 609,780

[22] Filed: May 14, 1984

[30] Foreign Application Priority Data

May 21, 1983 [DE] Fed. Rep. of Germany ....... 3318740

[51] Int. Cl.⁴ ...................... B60R 22/34; B65H 75/48
[52] U.S. Cl. .................................... 242/107; 280/807
[58] Field of Search ........................... 242/107–107.7; 280/806–807; 297/475–478; 248/222.3, 222.4, 223.3, 225.1, 223.4, 225.2

[56] References Cited

U.S. PATENT DOCUMENTS

| | | | |
|---|---|---|---|
| 1,322,869 | 11/1919 | Benedict | 248/222.4 X |
| 3,532,317 | 10/1970 | Adler | 248/225.2 |
| 3,767,135 | 10/1973 | Booth | 242/107.4 D |
| 3,948,460 | 4/1976 | Kondziola | 242/107.4 A |
| 4,129,267 | 12/1978 | Degras et al. | 242/107.4 A |
| 4,149,737 | 4/1979 | Magyar | 280/807 |
| 4,204,652 | 5/1980 | Cislak et al. | 242/107.4 R |
| 4,382,416 | 5/1983 | Kellogg-Smith | 248/222.3 |

FOREIGN PATENT DOCUMENTS

| | | | |
|---|---|---|---|
| 3125090 | 1/1983 | Fed. Rep. of Germany | 242/107 |
| 2020963 | 11/1979 | United Kingdom | 242/107.4 R |

Primary Examiner—John M. Jillions
Attorney, Agent, or Firm—Charles E. Leahy

[57] ABSTRACT

The housing of a seat belt retractor is provided with a T-shaped projection. During installation of the retractor, the shank of the T-shaped projection slides into a notch which is provided on the upper edge of a large cutout of the body member, while at the same time lugs provided on either side of the shank of the T-shaped projection engages the edges of the notch. At the same time, a pair of additional protruding members are engaging the upper edge of the body member and thus prevent tilting movement of the housing with respect to the body member. After aligning and positioning the housing on the body member, the housing is affixed to the body member by means of a threaded bolt.

2 Claims, 2 Drawing Figures

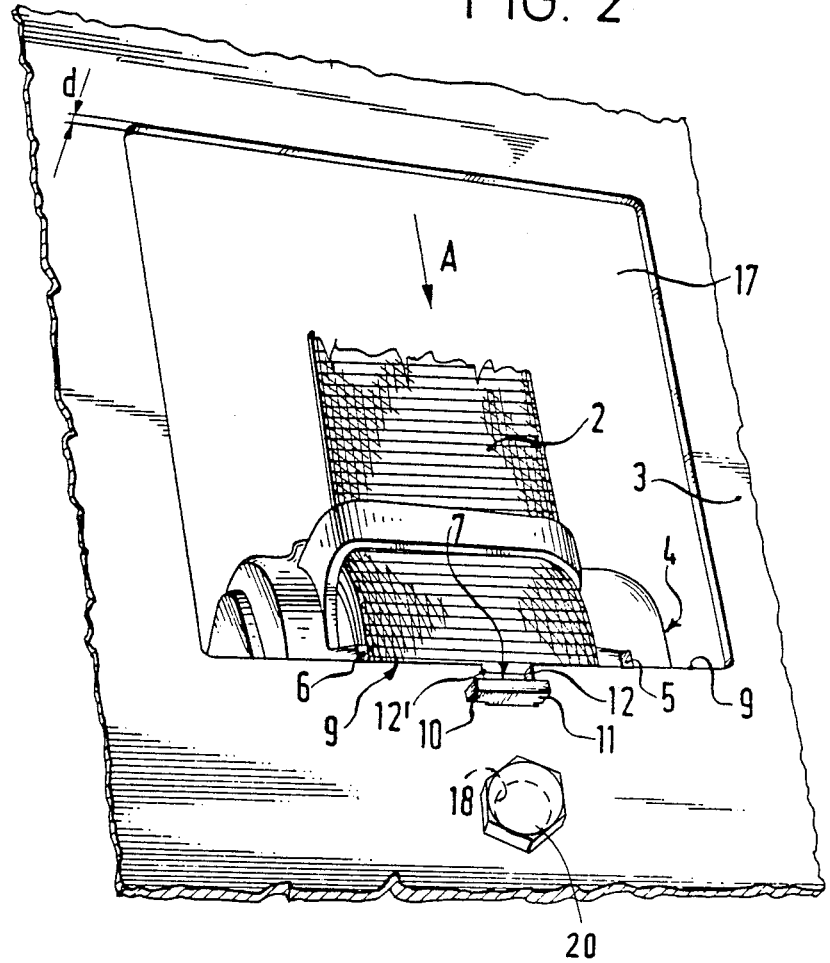

MOTOR VEHICLE WITH BELT RETRACTOR FOR A SEAT BELT SYSTEM

The invention relates to a motor vehicle provided with a belt retractor for a seat belt system, and more particularly provides a T-shaped tongue-like projection serving as a means of locating the retractor housing in its mounting position with respect to an aperture in the body member and a pair of additional protruding members on either side of the projection to anchor the retractor against tilting about the mounting bolt.

BACKGROUND OF THE INVENTION

In order to simplify the operation of mounting the belt retractor to the body panel, it has been proposed in German DE-OS No. 31 25 090 to provide a mounting position locating means whereby the retractor housing is supported on the body panel in a predetermined position.

In a known positioning means of this type for a belt retractor supported on a body member (DE-OS No. 31 25 090), a tongue-like projection is provided on the body member which extends over the interior body panel bearing against the housing and which engages into an associated opening provided in the housing. The tongue-shaped projection or the opening in the housing is provided with at least one shoulder which serves as a stop means to control the depth of insertion of the projection. While retaining the advantage of simplified assembly, this arrangement, i.e. the provision of shoulders on the tongue-shaped projection or the housing, will ensure that the tongue-shaped projection does not damage the wound-up belt in the housing after the housing has been threadedly secured to the body member. However, the shortcoming of this earlier seat belt retractor locating means is that the housing, while being mounted to the body member, must be held in place by the mechanic, so that the threaded bolts, by which the housing is fastened to the body, can be turned.

SUMMARY OF THE INVENTION

It is the object of the present invention to fashion the retractor housing and the associated body member in such a manner that the housing, while being mounted to the body, can be properly aligned and positioned on the respective body member without lengthy manipulations on the part of the mechanic, and that it need not be held in place by the mechanic while being attached to the body by way of threaded bolts.

This objective is achieved in accordance with the invention in that the seat belt retractor is provided with outwardly protruding tongues which bear against the surface of the associated body member, with at least one tongue extending through a notch or recess formed in the edge of the body member and being provided on its free end with one or more lugs which are adapted to engage the edge of the notch on the side facing away from the housing. Preferably, the member protruding from the front wall of the retractor housing and extending through the notch provided in the body member is a projection of a T-configuration. The shank of this T-shaped projection, which is extending through the notch, is of a length which corresponds to the thickness of the body member, and the two lugs at the end of the shank are adapted for engagement with the forwardly disposed surface of the body member.

A pair of additional protruding members, one on each side of the T-shaped projection extending through the notch, is provided on the front of the retractor housing, and is spaced at a distance above the T-shaped projection which corresponds to the depth of the notch.

In order that the retractor housing be properly aligned on the body and be retained thereon in a wobble free manner prior to being fastened by threaded fastening means, the invention, according to one particular modification, provides that the protruding members disposed on either side of the centrally disposed T-shaped projection are hook-shaped so that their downwardly pointing free ends are embracing the upper edge of the body portion.

Preferably, the notch in the area of the upper edge of the body member is of rectangular configuration, and the cross-sectional area of the T-shaped projection corresponds to the configuration of the notch.

One advantage of the subject belt retractor is that with only a nominal increase in the manufacturing costs for the body member and the retractor housing, the installation of the belt retractor assembly is considerably simplified and the retractor housing, once it is properly aligned with and secured to the body member, is reliably retained in position thereon after being attached thereto by threaded fastening means. The threaded bolt can be inserted into the corresponding threaded aperture in an expedient and reliable manner, and there is no need for subsequent inspections to ascertain that the housing is properly positioned and retained on the associated body member. Furthermore, the novel arrangement ensures that the housing, after its installation, is not displaced on the body member when the seat belt is subjected to jerks, because any tilting movement about the mounting bolt is absorbed by the one or other protruding member engaging the edge of the body member.

DESCRIPTION OF THE DRAWINGS

The present invention is adaptable to numerous arrangements, one of them being illustrated in the attached drawing, wherein:

FIG. 2 is a seat belt retractor according to FIG. 1 in the installed position.

DESCRIPTION OF THE PREFERRED EMBODIMENT

Figure 1:
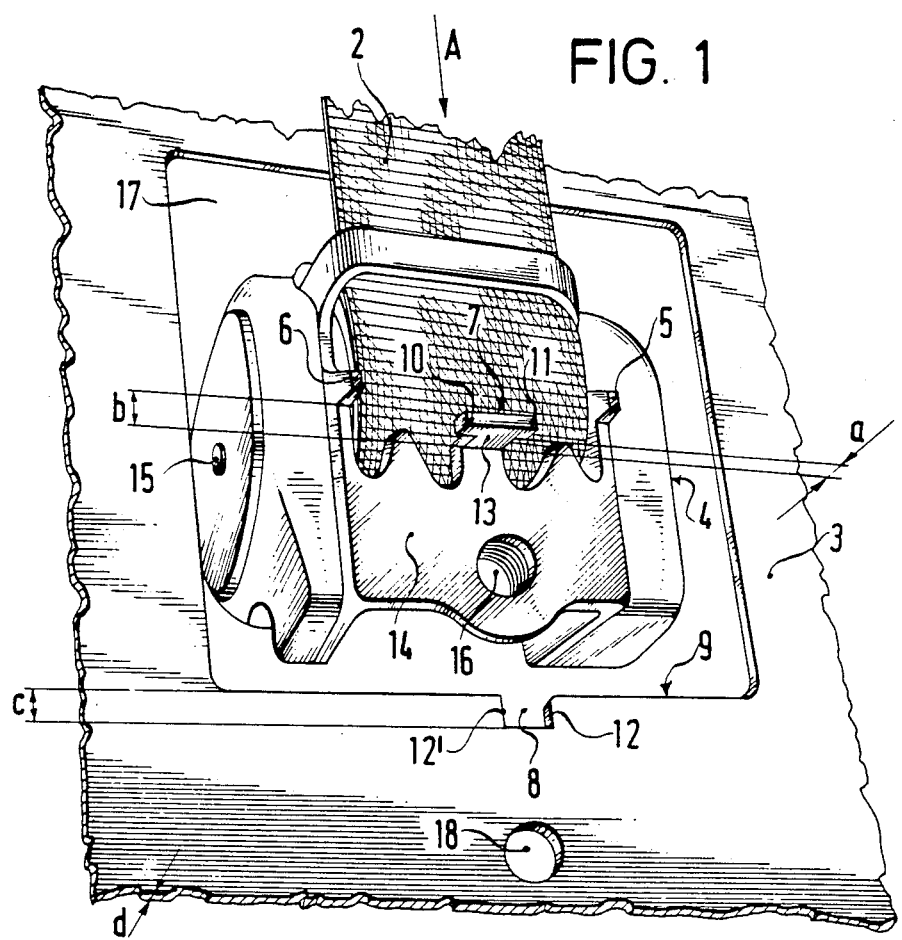
FIG. 1 is a perspective view of the subject belt retractor in a position prior to its installation to the body member.

The seat belt retractor is comprised essentially of a housing 4, a reel shaft 15 on which the seat belt 2 is stowed and which is journaled in housing 4. A tongue-like projection 7 extends forwardly from the front wall 14 of the housing 4 and is comprised of a shank 13 and a pair of laterally extending lugs 10 and 11 which are disposed on the free end of the projection 7. Two additional protruding members 5 and 6 are symmetrically arranged with respect to the projection 7. A threaded aperture 16 is provided in front wall 14 of the housing 4 for securing the retractor housing to the body member 3. The body member 3 is provided with a rectangular cutout 17 for the mounting of the belt retractor, with the lower edge of said cutout being provided with a rectangular notch or recess 8. Below the notch 8, the body member 3 is provided with a fastening hole 18.

The letter b indicates the distance between the T-shaped projection 7 and the pair of additional protruding members 5 and 6. The letter d represents the thickness of the body member 3, and c the depth of the notch 8, whereas a indicates the length of the shank of the protruding member 7.

The mounting of the belt retractor to the body panel 3 proceeds in that the housing 4 is moved downwardly in the direction of arrow A until the projection 7 is seated in the notch 8 and, at the same time, the projections 5 and 6 are engaging the edge 9 of the body member 3. In this position, the hole 18 in the body member 3 is in exact alignment with the threaded hole 16, so that a suitable machine bolt 20 can be threaded into the hole. The lateral lugs (10 and 11) provided on the projection 7 respectively engage the lateral edges 12 and 12' to ensure that the housing 4 of the belt retractor cannot tilt rearwardly. Furthermore, the projections 5 and 6 prevent lateral tilting of the housing 4. The surface area of the front wall 14 of the heavy gage steel housing is flat throughout so as to be in flush engagement with the corresponding rear surface of the body member 3. The projections 6 and 7 may also be disposed on the lateral plastic caps of the belt retractor.

The embodiments of the invention in which an exclusive property or privilege is claimed are defined as follows:

1. In a motor vehicle equipped with a seat belt retractor for a seat belt system, with the seat belt retractor including a housing adapted to be mounted to a vehicle body member having first and second mounting apertures, a reel shaft journaled in said housing for stowing the seat belt, and a tongue-shaped projection on said housing for fitting in the first aperture and serving as a stop means for aligning and positioning and maintaining the retractor housing with respect to the body member for subsequent installation of a fastener bolt between the retractor housing and the second mounting aperture so that the fastener bolt anchors the retractor on the body member, the improvement comprising:

said first mounting aperture being a large cutout having a central notch and a body member wall extending laterally on each side of the central notch said central notch being adapted to receive the tongue-shaped projection of the housing; and first and second projection lugs integral with the housing and projecting therefrom on either side of the tongue-shaped projection in laterally spaced relation therefrom and adapted to extend through the large cutout and engage with the body member wall of the cutout laterally each side of the notch whereby to prevent tilting of the housing with respect to the body member.

2. In a motor vehicle equipped with a seat belt retractor for a seat belt system, with the seat belt retractor including a housing adapted to be mounted to an apertured body member and a reel shaft journaled on the housing for stowing the seat belt, and said housing having a T-shaped projection adapted to fit into a notch provided in the apertured body member and a bolt aperture for receiving a load carrying attaching bolt to attach the housing to the apertured body member and carry the occupant restraint load, the improvement comprising:

said retractor housing being provided with first and second projection lugs integrally bent from the housing on either side of the T-shaped projection in laterally spaced relation therefrom and facing toward the bolt aperture and adapted to engage the apertured body member in a manner preventing tilting of the retractor housing about the attaching bolt while the attaching bolt carries the entire occupant load.

* * * * *